Nov. 28, 1967   J. J. COPELAND ET AL   3,354,928
TIRE DEMOUNTING MACHINE
Filed Oct. 8, 1965   3 Sheets-Sheet 1

Jesse J. Copeland
Jack H. Coe
INVENTORS.

BY *Clarence A. O'Brien*
*and Harvey B. Jacobson*
Attorneys

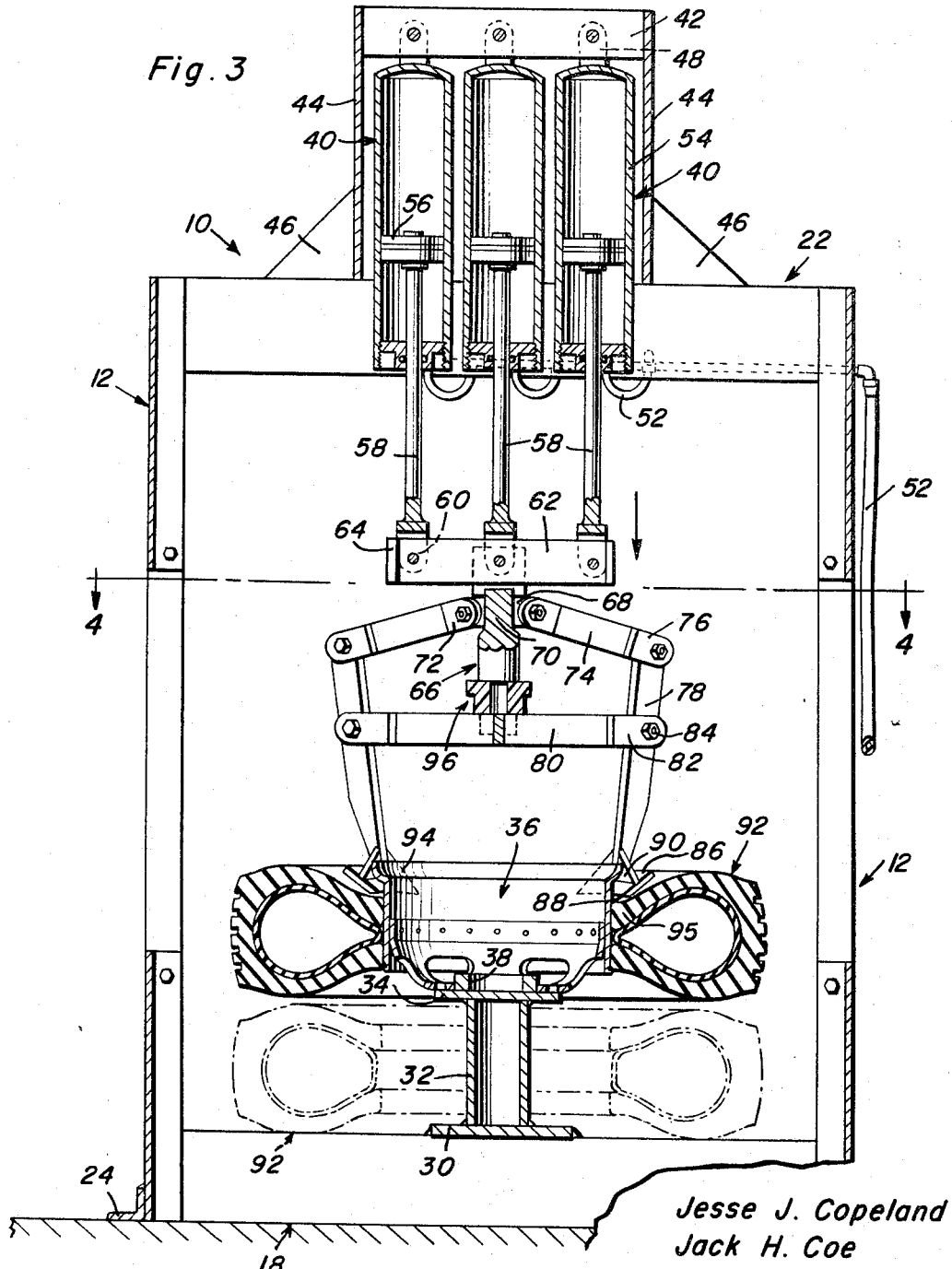

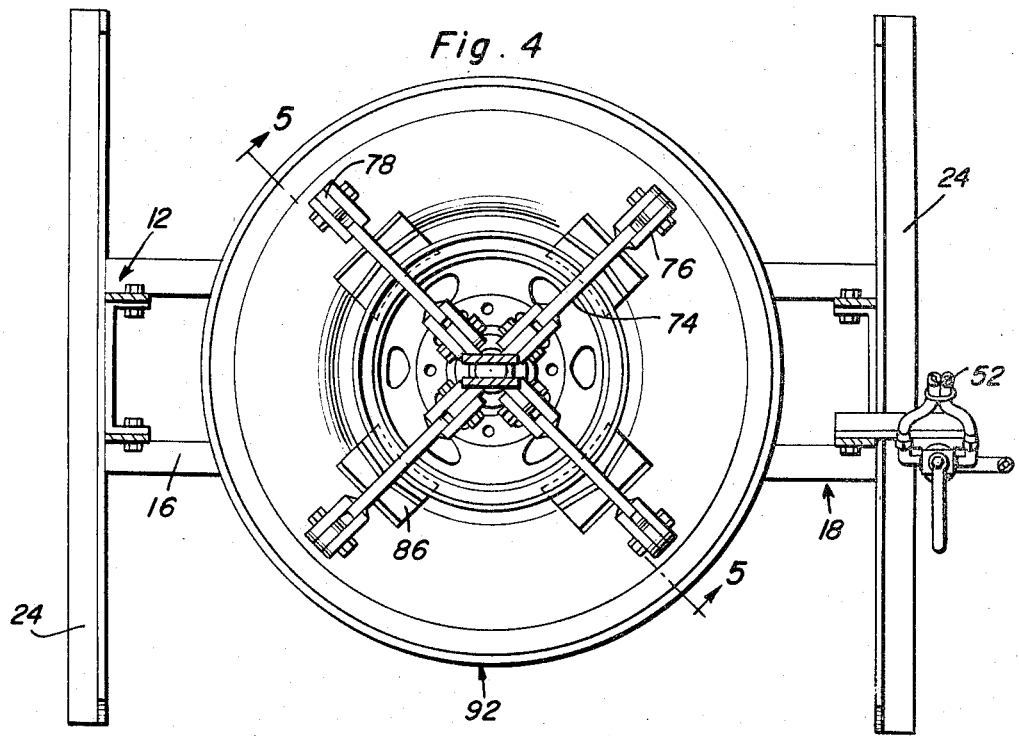
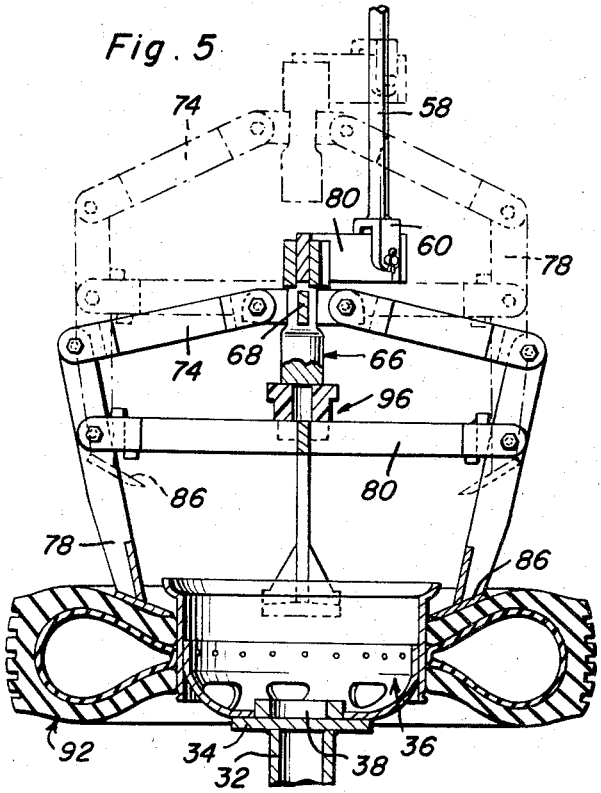
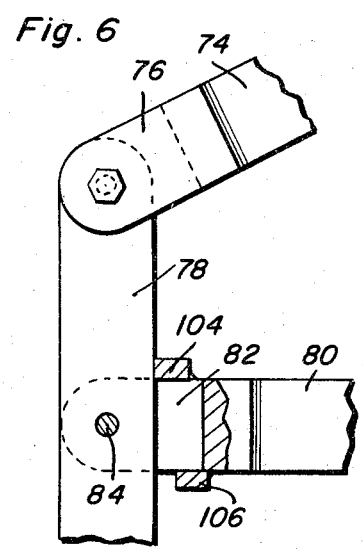
Jesse J. Copeland
Jack H. Coe
INVENTORS.

United States Patent Office 3,354,928
Patented Nov. 28, 1967

3,354,928
TIRE DEMOUNTING MACHINE
Jesse J. Copeland and Jack H. Coe, Hanford, Calif., assignors to Hitchcock Transportation Co., a corporation of California
Filed Oct. 8, 1965, Ser. No. 493,964
7 Claims. (Cl. 157—1.2)

ABSTRACT OF THE DISCLOSURE

A plurality of pressure arms are mounted for pivotal and vertical movement in response to the selective extension and retraction of three fluid rams for engagement with a pedestal mounted tire and wheel in a manner so as to effect an automatic stripping of the tire from the wheel. The rams, upon an activation thereof, automatically engage the pressure arm shoes above the tire bead and subsequently exert a vertical force thereon so as to accomplish the stripping of the tire. The inward movement of the pressure arm shoes so as to overlie the tire bead is limited by a limit block either with or without various adapters so as to accommodate the inward movement of the shoes to the particular size tire involved.

---

The present invention is generally concerned with tire demounting apparatus, and more particularly relates to a device which will, in a single operation, strip a tire from its wheel.

It is a primary object of the instant invention to provide a tire demounting device capable of rapidly, efficiently and safely stripping a tire from its wheel subsequent to the removal of the lock ring.

In conjunction with the above object, it is also a significant object of the instant invention to provide a device which is self-contained and compact and adapted for automatic operation utilizing the compressed air supply conventionally available in all tire repair shops.

Further, it is an object of the instant invention to provide a tire demounting device which, through the compact self-contained nature thereof and its operation through compressed air, can actually be used in the field inasmuch as many service trucks carry their own gasoline motor operated air compressors.

In addition, it is an object of the instant invention to provide a device which can be quickly and simply adapted to accommodate different size wheels, this being done without necessitating any actual mechanical modifications of the basic device.

Basically, in achieving the above objects, it is contemplated that the device of the instant invention include a self-standing vertical frame having a vertically projecting tire-receiving and centering pedestal mounted on the base thereof and a plurality of radially orientated pressure arms mounted thereabove for vertical movement, under the influence of a gang of compressed air rams, into engagement with the tire in a manner so as to strip it from the wheel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged vertical cross-sectional view through the device illustrating the specific details thereof;

FIGURE 4 is a horizontal cross-sectional view taken substantially on a plane passing along line 4—4 in FIGURE 3;

FIGURE 5 is a partial cross-sectional view taken substantially on a plane passing along line 5—5 in FIGURE 4;

FIGURE 6 is an enlarged detail of the joint construction associated with the mounting of the pressure arms;

Figure 1:
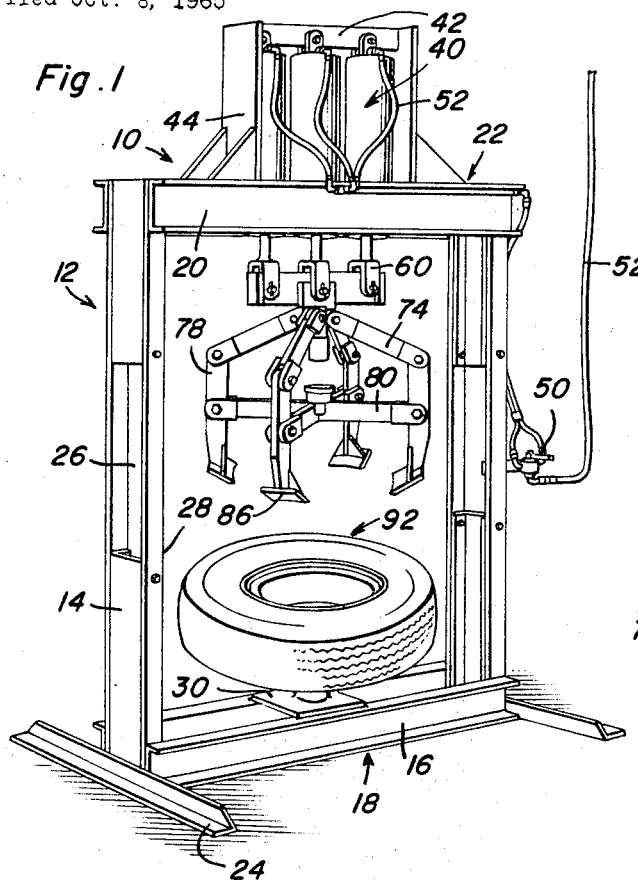
FIGURE 1 is a perspective view of the device of the instant invention with a tire to be stripped being illustrated therein.
Figure 2:
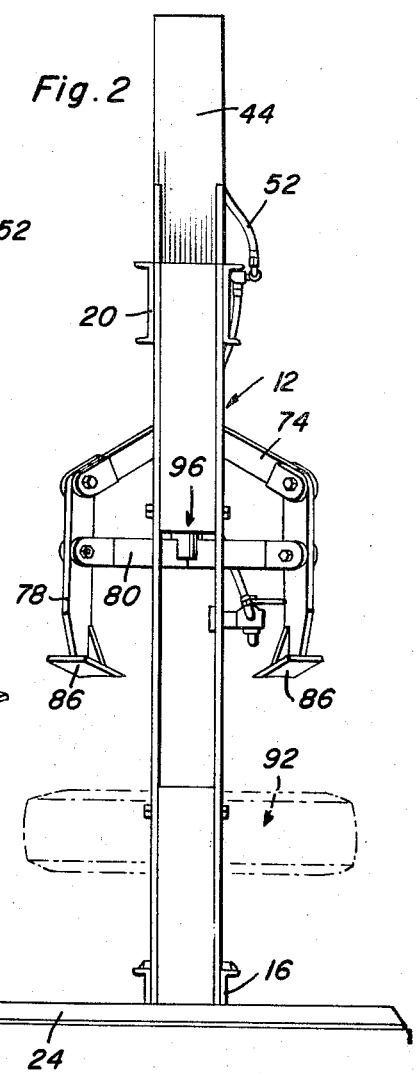
FIGURE 2 is a side elevational view of the device.
Figure 7:
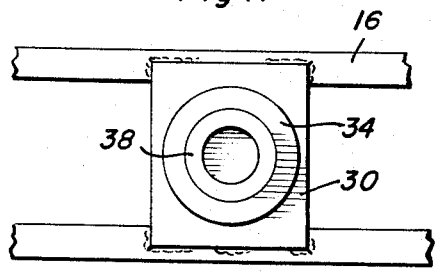
FIGURE 7 is a top plan view of the pedestal portion of the device.
Figure 8:
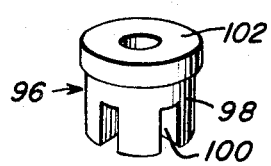
FIGURE 8 is a perspective view of the adapter utilized in adapting the device to different size wheels.
Figure 9:
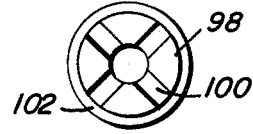
FIGURE 9 is a bottom plan view of the adapter.

Referring now more specifically to the drawings, reference numeral 10 is used to generally designate the tire demounting device or machine comprising the instant invention. This device includes a vertical frame 12 consisting of a pair of opposed vertical channel-shaped columns 14 interconnected at their lower ends by outwardly directed transversely extending channels 16 forming the base 18 of the frame 12, and interconnected at their upper ends by a pair of similar outwardly directed channels or channel members 20 forming the head 22 of the frame 12. Additional stability is introduced into the frame 12, and the frame is made self-standing by a pair of angle members 24 welded at right angles across the outer faces of the two vertical channels 14. Incidently, with regard to the vertical channels 14, it will be noted that the bight portion thereof is discontinuous so as to provide a vertically elongated opening 26, thereby allowing a complete viewing of the operating portion of the device 10 completely thereabout. The flanges of the side channels 14 are reinforced by full height side plates 28 which extend across and define the opening 26 in each channel 14.

Mounted centrally on the base 18, through a flat plate 30 spanning and welded to the parallel channel members 16, is a vertically extending cylindrical pedestal 32 which in turn has a flat circular plate 34 welded to the upper end thereof. This plate 34, as will be appreciated from the drawings, is of a size so as to engage a tire wheel 36 about the central opening at the lock ring side thereof upon a centering of the wheel 36 on the plate through a centering disk or ring 38 welded to the upper face of the plate 34 concentric therewith and with the pedestal 32. It will be noted that the tire wheel 36, illustrated in mounted position in the drawings, has the lock ring removed therefrom, thus readying the wheel for a slipping of the tire therefrom in a manner which shall be described presently.

Mounted vertically above the pedestal and centrally of the frame are three aligned compressed air rams 40. These rams 40 are oriented between the beams 20 of the frame head 22 and are pivotally secured to a crossbeam 42 fixed above the head 22 by a pair of opposed vertical side plates 44 which are in turn braced relative to the head beams 20 by triangular gusset plates 46. Each of the rams 40 is to be hingedly engaged with the crossbeam 42 by a clevis and pin connection which allows limited movement of the rams 40. The rams 40 are to be operated from any conventional compressed air system through a control valve 50 and air lines 52 selectively leading to both the top and bottom ends of the ram cylinders 54 so as to effect a reciprocal movement of the contained pistons 56 and the projecting and depending piston rods 58. The lower end of each of the piston rods 58 is provided with a clevis 60 which is hingedly pinned to a pressure beam 62, thereby allowing for a limited movement therebetween. As will be noted in the drawings, the central piston rod 58 engages the pressure beam 62 at the center thereof while the two end piston rods 58 engage the pressure beam 62 at the opposite ends thereof, the extreme ends of the pressure beam 62 having abutment plates 64 welded thereto and engageable by the end clevises so as to form limits for the movement between the pressure beam 62 and the clevises 60. In this manner, there will be no danger of binding during the operation of the device, while at the same time providing for a substantially constant horizontal orientation of the pressure bar 62.

Rigid with and depending from the center of the pressure beam 62 directly below the central piston rod 58 is a cylindrical stop block 66 having four radially projecting ears 68 rigid with, as by welding, the reduced upper end 70 thereof. Each of these ears 68 is pivotally secured to the clevis 72 on one end of an elongated rigid link 74 which is provided with a similar clevis 76 on the outer end thereof. Each of the clevises 76 is in turn pivotally engaged with the upper end of a substantially vertical pressure arm 78. These arms 78, at approximately the center thereof, are interconnected by crossed bars 80 having clevises 82 fixed to the opposite ends thereof and pivotally engaged with the pressure arms 78 by pivot pins 84. The lower end of each pressure arm 78 is provided with a flat downwardly and inwardly angled pressure shoe 86 having an arcuate tapered leading edge 88 substantially conforming to the curvature of a tire wheel. The shoe 86, in each instance, is further stabilized and rigidified relative to the corresponding arm 78 by plates 90 extending between each arm 78 and the shoe 86 thereon in substantially the plane of the inner edge of the arm 78. It should be pointed out that all of the aforedescribed pivoted joints are provided so as to allow for a slight amount of free movement so as to eliminate any binding problems and allow for slight variations and irregularities in wheels of the same size.

In actual operation, after a removal of the lock ring, the wheel-mounted tire 92 is centered on the pedestal top plate 34 through the centering ring 36, after which compressed air is introduced into the cylinders 54 and the pressure arms 78, through the pressure head 62 and links 74, are lowered vertically so as to engage the shoes with the tire casing. Upon engagement of the shoes with the casing, further downward movement of the pressure arms 78 is resisted whereby a pivoting of these arms about the cross frame pivot pins 84 is effected so as to move the shoes 86 inwardly beneath the wheel rim 94 in overlying relation to the tire bead 95. This inward movement of the pressure arms 78 is limited by engagement of the limit block 66 with the top of the cross frame bars 80 at the center thereof. At this point, the edges 88 of the shoes 86 being spaced slightly from the wheel hub so as to avoid a clamping thereof, the arms 78 continue their vertically downward travel pushing the tire 92 from the wheel 36 in a manner which will be obvious from FIGURE 3 of the drawings. At this point the ram pistons 58 are retracted, thus moving the pressure arms radially outward and vertically upward away from the wheel 36 so as to enable a removal of both the wheel 36 and the tire 92. The fixed rigid pedestal 32, the centering ring 38, and the particular relationship between the pressure-applying elements so as to maintain equal pressure on all shoes 86 all contribute to the efficient, fast and safe operation of the device in performing its intended function. Incidently, it will be noted that no vertical or horizontal guides are necessary so as to guide the movement of the pressure unit, Other than the guiding function provided by the three aligned rams 40 applying equal pressure, from a common source, to the horizontal pressure bar or beam 62.

In order to accommodate different size wheels 36 without necessitating any time-consuming mechanical adjustments of the apparatus, it is contemplated that unique adapter blocks 96 be utilized, preferably one block for each different size wheel being provided. These blocks 96 consist of a cylindrical body 98 having two pairs of diametrically opposed slots 100 therein so as to enable a seating of the adapter block 96 on the crossed members 80 at the center thereof. In addition, the adapter block 96 includes an enlarged circular head 102 which is oriented above the crossed bars 80 and provides a surface against which the stop block or limit block 66 engages, thereby terminating the radial inward movement of the pressure shoes 86 sooner than would be the case if the limit block 66 where to engage the crossbars 80. In addition, referring specifically to FIGURES 5 and 6, it will be noted that upper and lower abutments 104 and 106 are provided so as to constitute opposite limits to the movement of the pressure arms 78, these abutments 104 and 106 being welded to the crossbar clevis 82 at the corresponding end of the crossbar 80. The upper abutment 104 provides for a substantial vertical positioning of the pressure arms 78 while the lower bar 106 prevents inward movement of the pressure shoes 86 beyond a certain point, this point normally corresponding to that reached by engagement of the limit block 66 with the crossbars 80.

From the foregoing, it should be appreciated that a novel tire demounting device has been defined, this device incorporating simplicity of construction with an efficient and positive operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire demounting device comprising a frame, an upwardly projecting tire receiving pedestal rigidly fixed relative to said frame, at least two aligned spaced fluid rams mounted vertically on said frame in spaced relation above said pedestal, each ram including a depending extensible and retractable shaft, an elongated generally horizontal pressure beam, said beam being fixed to the lower ends of the ram shafts, said shafts being engaged with the beam at the opposite ends thereof, the center of said beam being in vertical alignment with said pedestal, a plurality of elongated radially projecting links, means pivotally mounting the inner ends of said links on the beam at the center thereof, a vertically elongated pressure arm associated with each link, means pivotally interlocking the upper end of each arm with the outer end of the associated link, cross-bracing means extending between the vertical pressure arms, means pivotally securing said cross-bracing means to each of said arms at a point between the upper and lower ends thereof, a pressure shoe rigidly fixed to the lower end of each pressure arm, each shoe being substantially flat and mounted with a downward and inward inclination, a limit block fixed to and depending centrally from the pressure beam below the inner ends of the radially projecting links for selective engagement with the cross-bracing means so as to limit pivotal movement of the arms in response to downward movement of the pressure beam, a removable adapter mountable on said cross-bracing means in a manner so as to project centrally thereabove for engagement by the limit block, thereby modifying the limit of pivotal movement of the arms, said cross-bracing means comprising a plurality of bar portions extending radially outward from a common center to the individual arms, said removable adapter including a body defining a downwardly opening recess for receiving each bar portion so as to enable a fixed positioning of said adapter at the center of the bar portions, said adapter also including a flat upper end for engagement by said limit block.

2. The structure of claim 1 including a third fluid ram located between and aligned with the first two rams, said third ram being oriented in substantial vertical alignment with the pivotally mounted inner ends of the links.

3. The structure of claim 1 including limit means mounted on said cross-bracing means adjacent each arm, said limit means limiting the pivotal movement of the arms relative to the cross-bracing means between a first substantially vertical position and a second position wherein the pressure shoes are moved inward.

4. A tire demounting device comprising a frame, an upwardly projecting tire receiving pedestal fixed relative to said frame, selectively extensible and retractable ram means mounted vertically on said frame in spaced relation to said pedestal, a limiting abutment on the extensible and retractable lower end of said ram means, a plurality of elongated radially projecting links having the inner ends thereof pivotally mounted on the lower end of the ram means immediately above the limiting abutment, a vertically elongated pressure arm associated with each link, means pivotally interlocking the upper end of each arm with the outer end of the associated link, cross-bracing means extending between the vertical pressure arms in free spaced relation below the limiting abutment on the lower end of the ram means, means pivotally securing said cross-bracing means to each of said arms at a point between the upper and lower ends thereof, and a pressure shoe rigidly fixed to the lower end of each pressure arm, the central portion of said cross-bracing means constituting a stop for the limiting abutment, and limit means mounted on said cross-bracing means, said limit means limiting the pivotal movement of the arms relative to the cross-bracing means between a first substantially vertical position and a second position wherein the pressure shoes are moved inward, said ram means, upon an activation thereof, operating in a continuous automatic extending stroke to initially move the pressure arms vertical until engagement is made with a pedestal supported tire at which time an inward swinging of the pressure shoes occur until the limiting abutment engages the cross-bracing means and a continuing of the vertical movement is effected to complete the tire demounting.

5. The structure of claim 4 wherein said ram means comprises an elongated pressure beam engaged by the depending extensible and retractable shafts of three longitudinally spaced vertical fluid rams, said shafts engaging the pressure beam at a central point and the two end portions thereof, said fluid rams being simultaneously operable for effecting a substantially vertical movement of the horizontally orientated beam, said limiting abutment depending vertically from the center of said beam.

6. The structure of claim 5 including variable height adapter means selectively engageable means said limiting abutment and the central portion of said cross-bracing means for varying the relative distance between the limiting abutment and the cross-bracing means at which an inward pivoting of the pressure shoes ceases.

7. The structure of claim 6 wherein said cross-bracing means comprises a plurality of bar portions extending radially outward from a common center to the individual arms, said adapter means including separate members each having a body defining a downwardly opening recess for receiving each bar portion so as to enable a fixed positioning of the member at the center of the bar portions, each of these members also including a flat upper end for engagement by said limiting abutment.

References Cited
UNITED STATES PATENTS

| | | | |
|---|---|---|---|
| 2,442,714 | 6/1948 | Stack | 157—1.2 |
| 2,446,963 | 8/1948 | Stolz | 157—1.2 |
| 2,536,139 | 1/1951 | Ritter | 157—1.2 |
| 2,618,320 | 11/1952 | Deysher et al. | 157—1.2 |

GRANVILLE Y. CUSTER, JR., *Primary Examiner.*